United States Patent
Choudhary

(10) Patent No.: US 9,660,533 B2
(45) Date of Patent: May 23, 2017

(54) BUCK-BOOST CONVERTER WITH SMOOTH TRANSITION CIRCUITS AND METHODS

(71) Applicant: Texas Instruments Incorporated, Dallas, TX (US)

(72) Inventor: Vijay N. Choudhary, Chandler, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/578,980

(22) Filed: Dec. 22, 2014

(65) Prior Publication Data

US 2015/0229215 A1    Aug. 13, 2015

Related U.S. Application Data

(60) Provisional application No. 61/937,974, filed on Feb. 10, 2014.

(51) Int. Cl.
 *H02M 3/158* (2006.01)
 *H02M 1/14* (2006.01)

(52) U.S. Cl.
 CPC ........... *H02M 3/1582* (2013.01); *H02M 1/14* (2013.01); *H02M 3/1584* (2013.01)

(58) Field of Classification Search
 CPC ...... H02M 3/155; H02M 3/156; H02M 3/157; H02M 3/158; H02M 3/1582; H02M 3/1584; H02M 3003/1586
 See application file for complete search history.

(56) References Cited

U.S. PATENT DOCUMENTS

| | | | | |
|---|---|---|---|---|
| 2006/0284606 | A1* | 12/2006 | Chen | H02M 1/44 323/259 |
| 2010/0019745 | A1* | 1/2010 | Keskar | H03K 17/16 323/271 |
| 2011/0037446 | A1* | 2/2011 | Engelhardt | H02M 3/1582 323/282 |

OTHER PUBLICATIONS

Texas Instruments, Inc., "Understanding Buck-Boost Power Stages in Switch Mode Power Supplies," www.ti.com, Application Report, pp. 1-31, SLVA059A, Mar. 1999, Revised Nov. 2002, retrieved from world wide web, uniform resource locator: www.ti.com/lit/an/slva059a/slva059a.pdf, on Dec. 22, 2014.

* cited by examiner

*Primary Examiner* — Jeffrey Gblende
(74) *Attorney, Agent, or Firm* — William B. Kempler; Charles A. Brill; Frank D. Cimino

(57) ABSTRACT

A buck-boost converter with smooth transitions is disclosed. A buck-boost converter controller is disclosed including a first high side driver switch gate control signal output for controlling a first high side driver device; a first low side driver switch gate control signal output for controlling a first low side driver device; a second high side driver switch gate control signal output for controlling a second high side driver device; a second low side driver switch gate control signal output for controlling a second low side driver device; a state machine having four states comprising a buck state, a boost state, a transition buck state, and a transition boost state; a hysteresis timer indicating a pulse width greater than a predetermined threshold coupled to the state machine; and a minimum timer indicating a pulse width less than a predetermined threshold coupled to the state machine. Methods are also disclosed.

13 Claims, 9 Drawing Sheets

| INPUTS | | STATE | | NEXT STATE | | OUTPUTS | | | |
|---|---|---|---|---|---|---|---|---|---|
| MIN TIMER | HYS TIMER | | | | | LDRV1 | LDRV2 | HDRV1 | HDRV2 |
| 1 | 0 | BUCK | 1000 | TRAN_BOOST | 0001 | pwm | 0 | pwm_c | 1 |
| 0 | x | BUCK | 1000 | BUCK | 1000 | | | | |
| 1 | 0 | BOOST | 0100 | TRAN_BUCK | 0010 | 0 | pwm | 1 | pwm_c |
| 0 | x | BOOST | 0100 | BOOST | 0100 | | | | |
| x | 0 | TRAN_BOOST | 0001 | TRAN_BUCK | 0010 | SAME AS BOOST | | | |
| x | 1 | TRAN_BOOST | 0001 | BOOST | 0100 | | | | |
| x | 0 | TRAN_BUCK | 0010 | TRAN_BOOST | 0001 | SAME AS BUCK | | | |
| x | 1 | TRAN_BUCK | 0010 | BUCK | 1000 | | | | |

4-STATE STATE TRANSITION TABLE 80

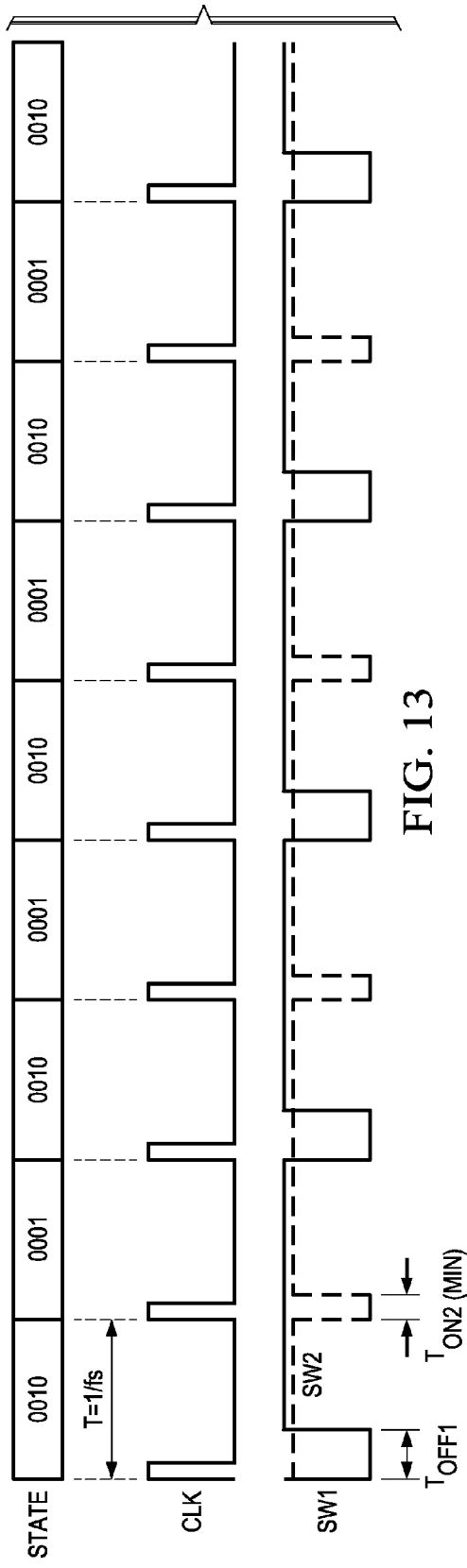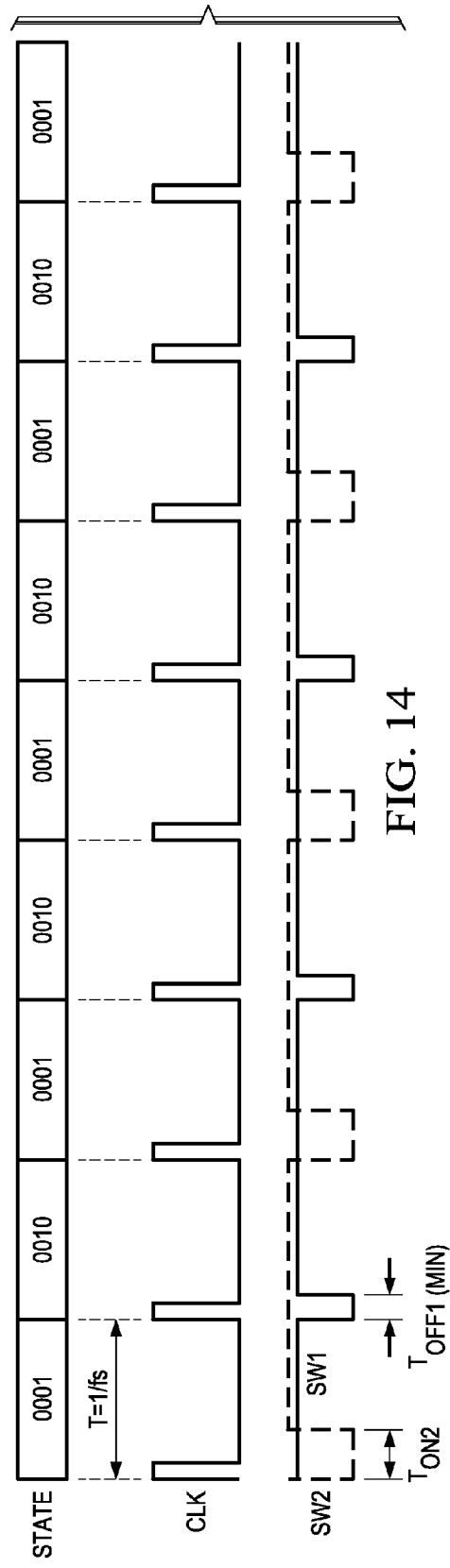

BUCK-BOOST CONVERTER WITH SMOOTH TRANSITION CIRCUITS AND METHODS

RELATED APPLICATIONS

This patent application claims priority to U.S. Provisional Application Ser. No. 61/937,974 entitled "Smooth Transition Buck-Boost Converter to Avoid Oscillations in the Transition Region," filed Feb. 10, 2014, which is hereby incorporated by reference herein in its entirety.

TECHNICAL FIELD

The present application relates generally to the use of synchronous switching circuits in a switching buck-boost DC-DC converter for providing an output voltage from an input voltage, and more particularly, to providing an efficient switching converter in a buck-boost configuration that is applicable to a variety of applications where a DC output voltage is provided from a DC input voltage that can be greater than or less than the DC output voltage.

BACKGROUND

Recent improvements for DC-DC switching power supply circuits are increasingly important for use in portable and battery powered devices. Wide input voltage range and variable output voltages are increasingly important features for converters configured for automotive, computer and industrial applications. Recent deployment of USB 3.0 Power Driver devices also require high power in DC supply output voltages in order to power and also rapidly recharge USB coupled portable battery operated devices such as cellphones and tablets. In order to provide a particular output voltage to the system from a battery supply or other input voltage at a different voltage level, a buck-boost converter is often used. The buck-boost converter can provide a regulated and selectable or preconfigured output DC voltage when the input DC voltage is higher (buck mode) or lower (boost mode) than the output voltage. Wide input voltage ranges and a range of output voltages can be provided.

In a synchronous switching power converter, a clock signal at a more or less constant switching frequency is used to form a pulse to control switches, and the pulse width can be modulated (in pulse width modulation control, or "PWM") to control the switching circuits. These PWM switching converter circuits are far more efficient and run cooler than the linear regulators used previously to provide, for example, a stepped up or stepped down DC-DC voltage.

In a buck mode operation, a first high side driver device (which may be, for example, a MOSFET transistor) is coupled with its current conduction path between an input voltage terminal and a first switching node. A pulse width modulated signal coupled to a gate terminal of the first high side driver device by a controller circuit is used to turn on or "close" the first high side driver in an "on" state, and the pulse width modulated signal is used to turn off or "open" the first high side driver in an "off" state. These two states can alternate in a more or less constant frequency pattern. The "duty cycle" of the switching converter is a ratio of the "on" time of the first high side switch to the "off" time. In the buck converter mode, an inductor is coupled between the first switching node and an output terminal for the output voltage. An output capacitor is coupled between the output terminal and a ground terminal. By closing the first high side driver for the "on" state time, and driving current into the inductor during the "on" state, and then subsequently opening the high side driver for the "off" state time, current flows into the inductor and into the load at the output, and an output voltage is developed across the load that is supported by the output capacitor. A rectifying device is also provided coupled between the first switching node and a ground potential. The rectifying device is used to supply current into the inductor when the first high side switch is open, the "off time" for the circuit. Increasingly this rectifying device is replaced by a first low side driver switch; although diode rectifiers are sometimes used. Use of a MOSFET transistor for both the first high side switch and the first low side switch (replacing the older diode rectifier) creates a synchronous switching converter topology.

In a boost mode operation, the input voltage at the input node is at a lower level than the desired output voltage. In this mode, the input voltage node is coupled to a first switching node at one side of the inductor. At the opposite side of the inductor, a second switching node is coupled to a second high side driver switch that selectively couples the output voltage node to the second switching node of the inductor. A second low side driver switch selectively couples the second switching node of the inductor to a ground terminal. The output capacitor described above is coupled between the output voltage node and ground. Typically the high and low side driver switches are implemented using MOSFET transistors, although in alternative arrangements other transistors and diodes can be used.

In operation, the boost mode provides a DC output voltage higher than the DC input voltage. This is accomplished by keeping the input voltage at the first switching node at one side of the inductor, and switching the high side driver between the second switching node at the opposite side of the inductor so that the second switching node is selectively coupled to the output voltage node. When the second high side driver is "on" (or the high side switch is closed), stored energy from the inductor is applied to the output voltage node, and the second low side driver is then alternatively switched on, thereby coupling the switching node of the inductor to ground, so that the inductor energy is not applied to the output node, and the output voltage is then provided by the output capacitor. By using the second high and second low side drivers in alternate cycles, and by controlling the pulse width that turns on the second high side driver, the output voltage can be regulated to a DC voltage that is greater than the input voltage or "boosted" above the DC input voltage.

As is known to those skilled in the art, in a switching buck-boost converter that uses a constant clocking frequency and a duty cycle with pulse width modulation to control the high and low side drivers, a transition occurs between buck mode and boost mode when the input voltage nears or is equal to the output voltage.

In prior known buck-boost converters, a problem arises in the transition zone. When the input voltage approaches the output voltage from either direction, the prior known solution converter enters a transition zone where the buck-boost converter is switching between buck and boost modes. In this operation, the on time and off time for certain switches in the circuit can be monitored. When the on time and off time are below minimum times (as indicated by a measurement of the pulse width output from a pulse width modulator), the converter switches back and forth from buck to boost and from boost to buck modes. In a condition where the input voltage is within a certain range of the desired output voltage, the converter may move erratically from buck to boost modes over adjacent clock cycles and may transition between the modes in an uncontrolled, erratic, or oscillating fashion. In some prior known circuits, the converter will further oscillate between buck and boost modes within a single clock cycle. This oscillation can cause noise and inefficiency in the converter operations. In certain cases an oscillating condition can exist that produces noise in an audible range, so that in an application where people can hear the audible switching noise, the use of the prior known buck-boost converters can be impractical or can be precluded by the undesirable audible switching noise produced by the converter.

FIG. 1 depicts, for the purpose of explanation, a circuit diagram of a typical buck-boost switching converter circuit 10 in a four switch configuration. In FIG. 1, a first high side driver Q1 is shown coupled between the first switch node SW1 and an input voltage VIN. In FIG. 1, the example implementation shows the first high side driver Q1 implemented with an N-type MOSFET that is sufficiently large to provide the required or expected load current to the corresponding inductor (labeled L_1) during the "on" state in buck mode. Further, in circuit 10, a first low side driver Q2, which in this example is also an N type MOSFET device, is coupled between the switch node SW1 and a ground terminal through a current sense resistor RS1. During the "off" state of the switching circuit 10 in a buck mode of operation, the first low side switch Q2 provides a current path from the ground terminal Vss to supply load current to the inductor L_1.

In FIG. 1, a second high side driver Q3 is coupled between the inductor switching node SW2 and the output node VOUT for supplying an output voltage to a load (not shown). During "off" states of boost mode operation, the high side driver Q3 will be active and acts as a rectifying device. The high side driver Q3 is another N-type MOSFET that is sufficiently large to provide the required or expected load current to the output node VOUT from the inductor L_1 during the "off" state of a boost mode operation. A second low side driver Q4 is coupled between the inductor switching node SW2 and the ground terminal Vss, and provides current to the inductor L_1 during the "on" state in a boost mode of operation.

In FIG. 1, four gate signals are used to control the operation of the buck-boost converter. The first high side driver MOSFET Q1 has a gate control signal HDRV1. The first low side driver MOSFET Q2 has a gate control signal LDRV1. The second high side driver MOSFET Q3 has a gate control signal HDRV2. A second low side driver MOSFET Q4 has a second gate control signal LDRV2 as an input. These control signals are pulse width modulated during the buck and boost operations.

To operate the buck-boost converter 10, these four gate control signals are provided by a synchronous switch control circuit. A clock signal with a switching frequency $f_s$ and a cycle length of $1/f_s$ is used to control the gate control signals. By modulating the pulse widths (PWM) of the gate control signals, the input voltage at node VIN and output voltage at node VOUT are coupled to the inductor L_1 in a manner to produce the desired DC output voltage from the DC input voltage. Using the four switch converter circuit of FIG. 1, this DC-DC voltage conversion can be done when the input voltage is less than the output voltage Vout in a boost mode of operation, and when the input voltage is greater than the output voltage the conversion can be performed in a buck mode of operation.

In operation, with the converter circuit 10 in FIG. 1 active, a feedback path can be formed, for example, to sense the output voltage (or the output current) at the node VOUT. When the output voltage is lower than the desired output voltage, the width of the pulses used to control the first high and first low side drivers Q1, Q2 in FIG. 1 can be varied using pulse width modulation (PWM) to control the switching buck boost converter 10. The output voltage at the node VOUT is then proportional to the duty cycle of the gate control signal HDRV1 coupled to the high side driver Q1. The longer the high side driver Q1 is turned on in each clock cycle for the synchronous converter in a buck mode of operation, the higher the output voltage at node VOUT will be. When the output voltage at the node VOUT is higher than desired, the pulse width is modulated to reduce the on time for the high side driver Q1 and also increase the off time, the time that the low side driver Q2 is active for each clock cycle, to allow the output voltage at the node VOUT to decrease.

FIGS. 2A and 2B depict, in simplified circuit diagrams, the buck mode operations of a four switch buck-boost converter 20. In FIG. 2A, buck boost converter 20 is shown in a high side driver "off" state of a buck mode of operation. During buck mode operations, as shown by the dark lines in FIG. 2A and FIG. 2B, the output node VOUT is always coupled to the inductor L_1 at the switching node SW2. The second high side driver (Q3 in FIG. 1) is therefore always "on" or active in the buck mode of operations. In the "off" state in the buck mode of operation illustrated in FIG. 2A, the inductor L_1 supplies current to the output capacitor (not shown in FIGS. 2A and 2B, but CO is shown in FIG. 1) at the output node VOUT. The output voltage VOUT from the converter 20 is therefore supplied by the output capacitor CO and the current from the inductor L_1. In the "off" state of the buck mode of operation, the first low side driver (Q2 in FIG. 1) is active while the first high side driver Q1 is turned off. This operation is indicated by the heavy black lines in FIG. 2A, indicating which components are active in the circuit 20 in the "off" state of the buck mode of operation, labeled $T_{OFF1}$.

In FIG. 2B, the dark line illustrates the "on" state for the converter 20 in buck mode operations. In the buck mode "on" state, the input voltage VIN is coupled to the inductor L_1 at the switch node SW1 (by the first high side driver MOSFET Q1 in FIG. 1, for example), while the output node VOUT is always coupled to switch SW2 at the opposite side of inductor L_1 (by placing a high voltage at the gate terminal of the second high side driver Q3). In the "on" state for the buck mode, the input voltage at the node VIN is coupled to the switching node SW1 at one side of the inductor L_1 as shown in FIG. 1, and the output voltage node VOUT is coupled to the switching node SW2 at the other side of the inductor L_1. In this manner the output voltage at node VOUT is maintained by the input voltage at the node VIN, and the inductor L_1, which supplies current to charge the output capacitor CO (not shown) during the "on" state of buck mode operation. The dark lines in FIG. 2B show the current path for this mode, labeled $T_{ON1}$.

FIG. 2C illustrates, in a simplified timing diagram, the voltages at nodes SW1 and SW2 for the buck mode of operation of converter 20. Note that in the buck mode of operation, the output node VOUT is always coupled to the inductor L_1 at the switching node SW2. In FIG. 2C, the timing diagram illustrates the "off" time for the buck mode of operation when the first high side driver Q1 in FIG. 1 is off (and the low side driver Q2 is "on" or active and acts as a rectifier device), shown by the switching action at the switching node SW1 coupled to the inductor L_1. The time "$T_{OFF1}$" is the time when the low side driver Q2 in FIG. 1 is active in each clock cycle.

During each clock cycle, for signal CLK, node SW1 is at a high voltage (the input voltage at the node VIN) and at a low voltage (the ground potential) in alternating portions of the clock cycle. This action is accomplished by controlling the high side driver MOSFET Q1 and the low side driver MOSFET Q2, using the gate control signals HDRV1 and LDRV1 shown in FIG. 1 in a synchronous manner using pulse width modulation.

In FIGS. 3A and 3B, a simplified circuit diagram illustrates the operation of the buck-boost converter 30 (such as converter 10 shown in FIG. 1) in boost mode. In boost mode, the input voltage at the node VIN is lower than the output voltage desired at the output node VOUT. In boost mode, the input voltage VIN is always coupled to the switching node SW1. In boost mode the output node VOUT is alternatively coupled to, and then not coupled to, the switching node SW2. In FIG. 3A, the converter 30 is shown with the low side driver Q4 in FIG. 1 "on" shown as the time $T_{ON2}$, and thus the output voltage node VOUT is not connected to the inductor L_1 at the switching node SW2.

FIG. 3B illustrates the boost mode of operation when the output node VOUT is coupled to the switching node SW2. This happens in the $T_{OFF2}$ condition, when the low side driver Q4 in FIG. 1 is off, the high side driver Q3 is active, and the output voltage node VOUT is coupled to the inductor switching node SW2. By controlling the amount of time that the high side driver MOSFET Q3 and the low side driver Q4 are active using the gate control signals HDRV2, LDRV2 in pulse width modulation, the output voltage at the node VOUT can be controlled.

FIG. 3C illustrates the boost operation in a simplified timing diagram of the voltage at the switch nodes SW1 and SW2. For each clock cycle, the duty cycle is used to control the time the low side driver Q4 is active, and the time the high side driver Q3 is on, to control the MOSFET driver transistors in the boost mode of operation. Pulse width modulation is used to vary the duty cycle of the high side and low side driver transistors to control the output voltage VOUT.

In the prior known solutions, the buck boost converter transitions between buck and boost modes based on the duration of the control signals $T_{OFF1}$ and $T_{ON2}$. When operating in buck mode, a circuit controller determines if the pulse duration time $T_{OFF1}$ is less than a predetermined minimum time, indicating that the input voltage is very close to the output voltage and that the maximum duty cycle for the pure buck operation is exceeded. When the condition is met, a flag called "Tmin" is set and the converter transitions to boost mode. Similarly, in boost mode, the controller determines if the pulse duration time $T_{ON2}$ is less than a minimum, indicating the input voltage is very close to the output voltage, and thus the minimum boost duty cycle is exceeded, and when the condition is met as indicated by the flag "Tmin" the controller transitions to buck mode.

FIG. 4 illustrates the modes of operation of a buck-boost converter in a graph that plots input voltage $V_{IN}$, and the output voltage $V_{OUT}$ as voltage shown on the vertical axis, and plots time on the horizontal axis. The graph illustrates that the converter operates in buck mode when the input voltage is greater than the output voltage, shown as $V_{IN} > V_{OUT}$ starting at the left side of the graph near the vertical axis, the converter operates in boost mode as illustrated at the right side of the figure, when the input voltage is less than the output voltage shown as $V_{IN} < V_{OUT}$ at the right side of the graph, and in the center of FIG. 4, the converter enters a transition region when $V_{IN}$ is approximately equal to, or close, to the voltage of $V_{OUT}$.

The transition operation of a converter control circuit of the prior known solutions is shown in FIG. 5. In FIG. 5, a two state converter control configuration 50 is shown. When the converter 50 is operating in the buck mode, in the state numbered 51 labeled BUCK, and the condition "$T_{ON2,min}$" indicates that the pulse duration time $T_{OFF1}$ is less than a predetermined time duration, then the converter can no longer operate in only in pure buck mode (as the maximum duty cycle has been reached), and the converter then transitions to a boost mode of operation in a state labeled BOOST, numbered 53. When in the boost mode in state 53, when the condition "$T_{ON2,min}$" is met, the converter 50 transitions back to the buck mode 51. When the input voltage VIN is very close to or equal to the output voltage VOUT, the minimum conditions (referred to together as "Tmin") can be true each clock cycle, and the prior known converter 50 can go into an oscillation mode where it irregularly makes transitions between the two states 51 and 53, and this creates inefficiency, and random switching noise. Further, the transitions between the two states 51 and 53 can even occur within a single clock cycle. Because the transitions between buck and boost modes are not regular, noise filtering to reduce the switching noise is particularly difficult for a prior known buck-boost converter operating in this transition mode.

FIG. 6 depicts in a simulation plot of selected signals during an operation of a prior known buck-boost converter in a transition mode. In FIG. 6, the top trace labeled "VOUT" illustrates the ripple on the voltage output node, showing the effect of the frequent transitions between buck and boost mode on the output signal. The voltage at the switching node SW1 is depicted on the second trace from the top in FIG. 6. The voltage at the switching node SW2 is depicted on the third trace from the top in FIG. 6. The current flowing in the inductor L_1 is shown in the bottom trace of FIG. 6, labeled IL_1. The voltages at the switching nodes SW1 and SW2 show the buck-boost converter transitioning irregularly between buck and boost modes of operation, creating inefficiency and producing transient switching noise as can be seen in the output voltage VOUT.

Improvements in the operation of synchronous switching buck-boost converters are therefore needed to address the deficiencies and disadvantages of the known prior approaches.

SUMMARY

A buck-boost converter for producing a DC output voltage from a DC input voltage includes a first high side driver switch coupled between a node for receiving an input voltage and a first node for coupling to an inductor; a first low side driver switch coupled between the first node and a ground voltage; a second high side driver switch coupled between a node for outputting an output voltage and a second node for coupling to the inductor; a second low side driver switch coupled between the second node and a ground voltage; a control circuit for controlling the first high side switch, the second high side switch, the first low side switch, and the second low side switch and configured to operate as a buck-boost converter, and further including a state machine having four states comprising a buck state, a boost state, a transition buck state, and a transition boost state; a hysteresis timer having an output indicating a pulse width time greater than a threshold time has elapsed coupled to the state machine; and a minimum pulse timer having an output indicating a pulse width time less than a minimum threshold time has elapsed coupled to the state machine.

In another aspect of the present application, in the above arrangement, each of the first, second, third and fourth driver switches further include a transistor having a gate control signal as an input. In a further arrangement, in the buck-boost converter described above, the control circuit outputs a first high side driver signal coupled to the gate control signal of the first high side driver switch, a first low side driver signal coupled to the gate control signal of the first low side driver switch, outputs a second high side driver signal coupled to the gate control signal of the second high side driver switch, and outputs a second low side driver signal coupled to the gate control signal of the second low side driver switch.

In a further aspect of the present application, the above described buck-boost converter described above is provided wherein the control circuit further comprises a pulse width modulator generating a pair of pulse width modulated signals that are further coupled to the gate control signals of the first high side driver switch, the first low side driver switch, the second high side driver switch, and the second low side driver switch to control the level of the output voltage.

In still another aspect of the present application, in the buck-boost converter above, the state machine in the control signal transitions from the buck state to the transition boost state in response to the minimum timer flag. In a further aspect of the present application, the state machine in the control signal transitions from the boost state to the transition buck state in response to the minimum timer flag. In a further aspect of the present application, in the buck-boost converter described above, the state machine in the control signal transitions from the transition boost state to the transition buck state when the hysteresis timer output is false.

In a further aspect of the present application, in the above described buck-boost converter, the state machine in the control signal transitions from the transition boost state to the boost state when the hysteresis timer output is true.

In yet another aspect of the present application, in the above described buck-boost converter, the state machine in the control signal transitions from the transition buck state to the buck state when the hysteresis timer output is true.

In another aspect of the present application, a method for controlling a buck-boost DC to DC converter, includes providing an inductor coupled between a first switching node and a second switching node; in a buck mode state of a buck-boost controller, coupling a pulse width modulated switching signal to a first low side gate signal of a low side driver device coupled between the first switching node and a ground voltage, coupling a complementary pulse width modulated switching signal to the first high side gate signal of a first high side driver device coupled between the first switching node and an input voltage, and coupling an output voltage to the second switching node; in a boost mode state of the buck-boost controller, coupling the pulse width modulated switching signal to a second low side gate signal of a low side driver device coupled between the second switching node and the ground voltage, coupling the complementary pulse with modulated switching signal to the second high side gate signal of a second high side driver device coupled between the second switching node and the output voltage, and coupling the input voltage to the first switching node; in a transition buck mode state of the buck-boost controller, coupling a pulse width modulated switching signal to the first low side gate signal and coupling a complementary pulse width modulated switching signal to the first high side gate signal; and in a transition boost mode state of the buck-boost controller, coupling the pulse width modulated switching signal to the second low side gate signal of the low side driver device, and coupling the complementary pulse with modulated switching signal to the second high side gate signal.

In another aspect of the present application, the above described method includes providing a minimum timer flag that indicates the pulse width modulated switching signal has a duration less than a predetermined minimum pulse width. In still another aspect of the present application, the above described method further includes providing a hysteresis flag that indicates the pulse width modulated switching signal has a duration that is greater than a predetermined minimum pulse width.

In a further aspect of the present application, in the above described method, including operating the buck-boost controller in the buck state; receiving a true condition on the minimum timer flag; and transitioning the buck-boost controller to the transition boost state.

In another aspect of the present application, in the above described method, the method includes operating the buck-boost controller in the transition boost state; receiving a false condition on the hysteresis timer flag; and transitioning the buck-boost controller to the transition buck state.

In still another aspect of the present application, the above described method further includes operating the buck-boost controller in the transition boost state; receiving a true condition on the hysteresis timer flag; and transitioning the buck-boost controller to the boost state.

In yet a further aspect of the present application, in the above described method, the method includes operating the buck-boost controller in the boost state; receiving a true condition on the minimum timer flag; and transitioning the buck-boost controller to the transition buck state.

In another aspect of the present application, the above described method includes operating the buck-boost controller in the transition buck state; receiving a true condition on the hysteresis flag; and transitioning the buck-boost controller to the buck state.

In still another aspect of the present application, in the above described method, the method includes operating the buck-boost controller in the buck state; receiving a first differential voltage input indicating the difference between the input voltage and the output voltage is below a predetermined minimum delta voltage; and transitioning the buck-boost controller to the transition boost state.

In a further aspect of the present application, the above described method includes operating the buck-boost controller in the transition boost state; receiving a second differential voltage input indicating the difference between the input voltage and the output voltage is greater than a predetermined minimum delta voltage; and transitioning the buck-boost controller to the boost state.

In yet another aspect of the present application, an integrated circuit for controlling a four switch buck-boost DC to DC converter; includes a first high side driver switch gate control signal output for controlling a first high side driver device; a first low side driver switch gate control signal output for controlling a first low side driver device; a second high side driver switch gate control signal output for controlling a second high side driver device; a second low side driver switch gate control signal output for controlling a second low side driver device; a state machine having four states comprising a buck state, a boost state, a transition buck state, and a transition boost state and outputting the first high side driver switch gate control signal, the first low side driver switch gate control signal, the second high side driver switch gate control signal, and the second low side driver switch gate control signal; a hysteresis timer having an output indicating that a pulse width of a pulse width modulated switching signal is greater than a threshold time coupled to the state machine; and a minimum timer having an output indicating that a pulse width of a pulse width modulated switching signal is less than a minimum threshold time coupled to the state machine.

Recognition is made in aspects of this application of a solution for a controller for a buck-boost DC to DC voltage converter having a novel four state machine to provide smooth transitions between buck and boost operation. The novel arrangements disclosed reduce noise due to switching between modes and reduce inefficiency over the prior known solutions.

BRIEF DESCRIPTION OF THE DRAWINGS

For a more complete understanding of the illustrative embodiments described herein and the advantages thereof, reference is now made to the following descriptions taken in conjunction with the accompanying drawings, in which:

FIG. 13 illustrates in a simple timing diagram the state transitions made by an arrangement of the buck-boost controller in an aspect of the present application when in a buck mode with minimum boost cycles;

FIG. 14 illustrates in a simple timing diagram the state transitions made by an arrangement of the buck-boost controller in an aspect of the present application when in a boost mode with minimum buck cycles;

Corresponding numerals and symbols in the different figures generally refer to corresponding parts unless otherwise indicated. The figures are drawn to clearly illustrate the relevant aspects of the application and are not necessarily drawn to scale.

DETAILED DESCRIPTION

The making and using of example illustrative arrangements that form aspects of the present application are discussed in detail below. It should be appreciated, however, that aspects of the present application provide many applicable inventive concepts that can be embodied in a wide variety of specific contexts. The specific arrangements discussed are merely illustrative of specific ways to make and use the various aspects of the present application, and the examples described do not limit the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional connections may be used between any elements that are "coupled".

Figures 7, 8:
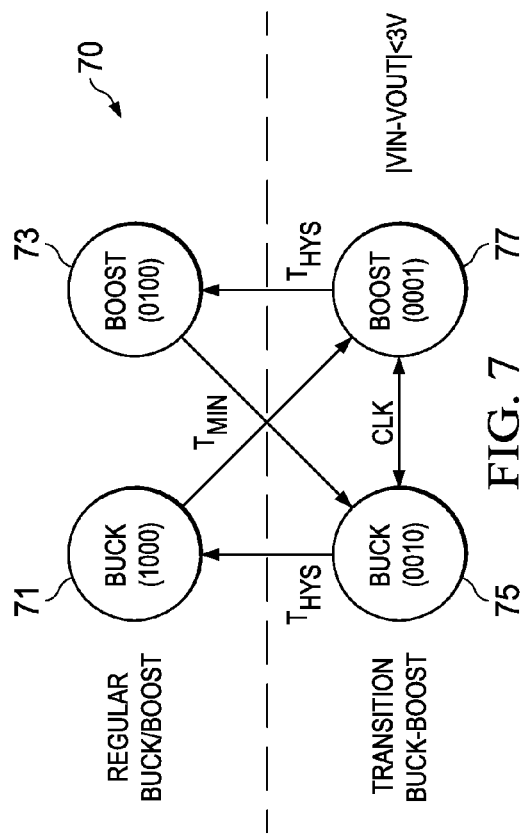
FIG. 7 illustrates in a state transition diagram the state transitions of an example buck-boost controller arrangement in an aspect of the present application.
FIG. 8 illustrates in a state table the operations of another buck-boost controller arrangement in an another aspect of the present application.

FIG. 7 illustrates in a simplified state diagram 70 the states for an example four state controller for controlling a four switch buck-boost converter in an aspect of the present application. In FIG. 7, a first state 71, with a state number "1000" is a BUCK mode of operation similar to the buck mode of the prior known solutions. In FIG. 7 a second state 73 illustrates a BOOST mode of operation numbered "0100" similar to the boost mode of the prior known solutions. In FIG. 7, a pair of novel states provide transition modes of operation. A BOOST transition state 77 numbered "0001" is a boost state used when the input voltage is within a predetermined range of the output voltage. A BUCK transition state 75 numbered "0010" is a buck state used when the input voltage is within a predetermined range of the output voltage.

Note that in FIG. 7 a four state controller example is illustrated. The state numbers used for this illustrative arrangement use four bits to encode the four state numbers. However, only two bits are necessary to encode four unique state numbers. The use of the four bit state field is one arrangement selected for convenience in decoding operations, however in an alternative arrangement that is also contemplated by the inventors, a two bit state field can also be used to form an additional aspect of the present application. Other state numbering arrangements can also be used with aspects of the present application.

In operation, the four state controller 70 can begin, for example, in BUCK mode in state 71 when the input voltage is substantially greater than the output voltage desired. When the input voltage nears the output voltage, the minimum timer flag $T_{MIN}$ may indicate that the pulse from a pulse width modulator PWM that is applied to the lower gate driver is at a minimum time duration. This minimum pulse width indicates that the switching converter can no longer regulate the output voltage using only the buck mode of the operation, that is, the maximum duty cycle available has been reached. In this case the controller state diagram 70 will transition from the BUCK state 71 to the transition BOOST state 77 as shown by the $T_{MIN}$ arrow exiting state 71.

In sharp contrast to the prior known solutions, the four state controller 70 will not return to the BUCK state 71 until a second condition flag indicating a predetermined hysteresis time is true. Instead, as shown in FIG. 7, the four state controller depicted in the state diagram transitions from the transition BOOST state 77 to the transition BUCK state 75. For each clock cycle that occurs until the hysteresis time is met, the four state controller 70 will remain in the two transition states 75, 77 and will transition in alternate clock cycles from the transition BUCK state 75 to the transition BOOST state 77. This action is indicated by the double ended line labeled "CLK" in FIG. 7. Because the state machine 70 transitions are controlled and predictable, any switching noise generated in switching between the buck and boost modes in the transition zone is also predictable, and can thus be filtered using noise filters to reduce it.

When the hysteresis timer time is met, as indicated in FIG. 7 when the flag $T_{HYS}$ becomes true in either the transition BUCK state 75 or the transition BOOST state 77, the four state controller 70 in FIG. 7 will transition back to a conventional BUCK state, 71, or to the conventional BOOST state, 73. By setting the hysteresis condition to measure a PWM pulse width of a certain predetermined time duration, the magnitude difference between the input voltage VIN and the output voltage VOUT can be bounded, so that in the transition states 75, 77, |VIN-VOUT| is less than a predetermined voltage. In FIG. 7, in an example implementation, a predetermined voltage of 3V is used, although other voltages can be used. This is indicated in FIG. 7 by the label |VIN-VOUT|<3V. When this inequality is true, in this example, the state machine 70 will remain in the transition states 75, 77.

By keeping the four state controller in the two transition states 75, 77 until the width of the PWM pulses are sufficiently wide to indicate a pure buck or pure boost operation can be used, the random and erratic oscillations of the prior known solution controllers between buck and boost modes is reduced or eliminated. The use of the novel arrangements in the present application enable reduction or elimination of the system noise and the inefficient power consumption of the prior known solutions.

Figure 1:
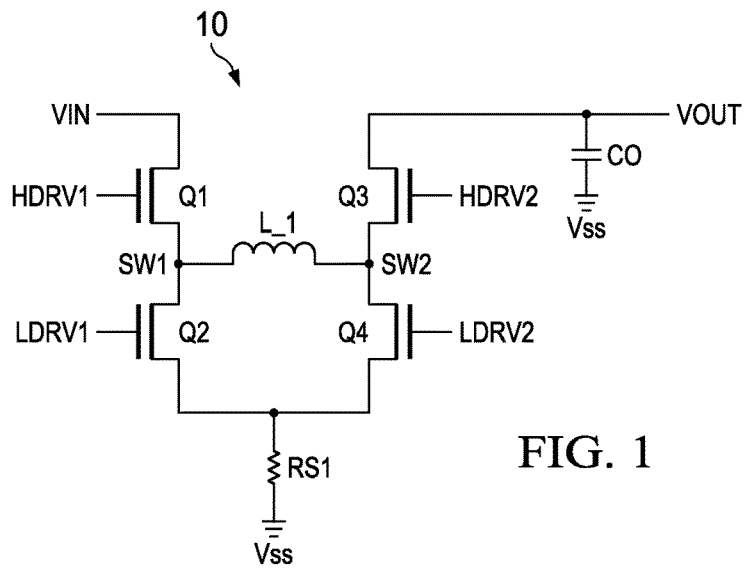
FIG. 1 illustrates in a circuit diagram a portion of a typical four switch buck-boost converter circuit.
Figure 2A:
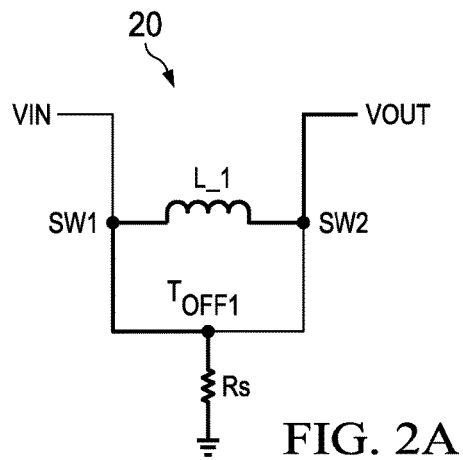
FIG. 2A illustrates in a simplified circuit diagram a conventional buck-boost converter circuit in a buck mode of operation.
Figure 2B:
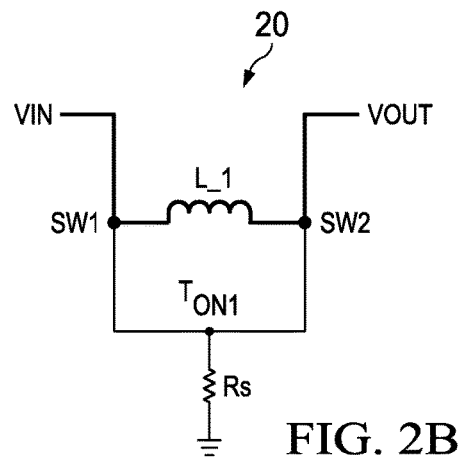
FIG. 2B illustrates in a simplified circuit diagram a conventional buck-boost converter circuit in another buck mode of operation.
Figure 2C:
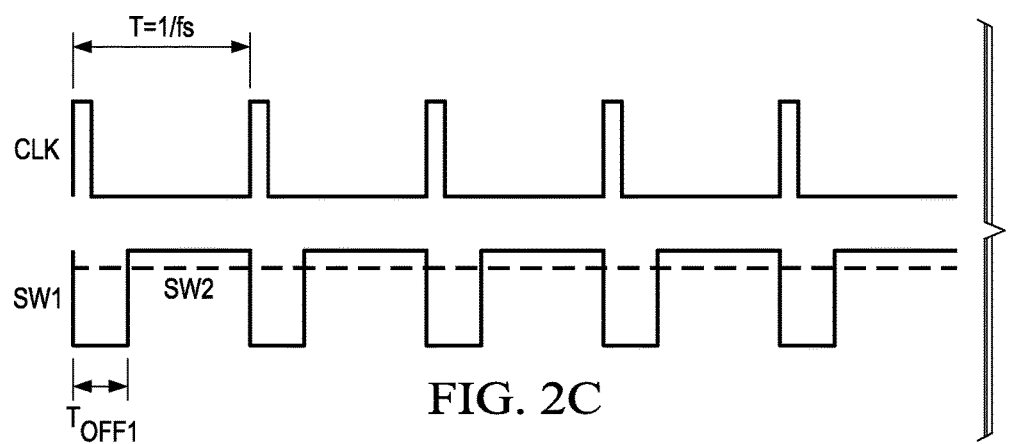
FIG. 2C illustrates in a simplified timing diagram the operations of the circuit shown in FIGS. 2A and 2B in a buck mode of operation.
Figure 3A:
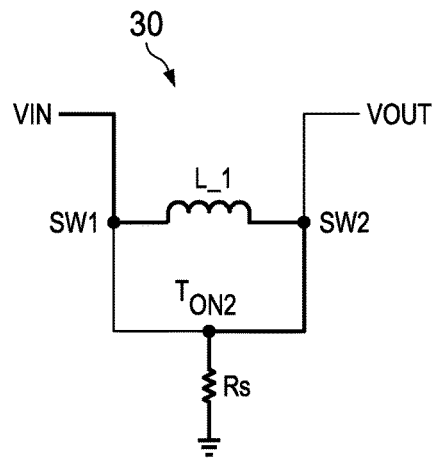
FIG. 3A illustrates in a simplified circuit diagram a conventional buck-boost converter in a boost mode of operation.
Figure 3B:
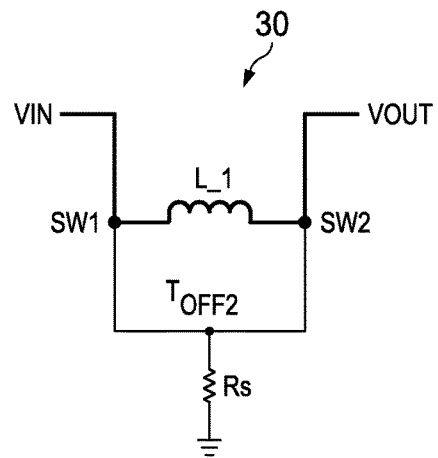
FIG. 3B illustrates in a simplified circuit diagram a conventional buck-boost converter in another boost mode of operation.
Figure 3C:
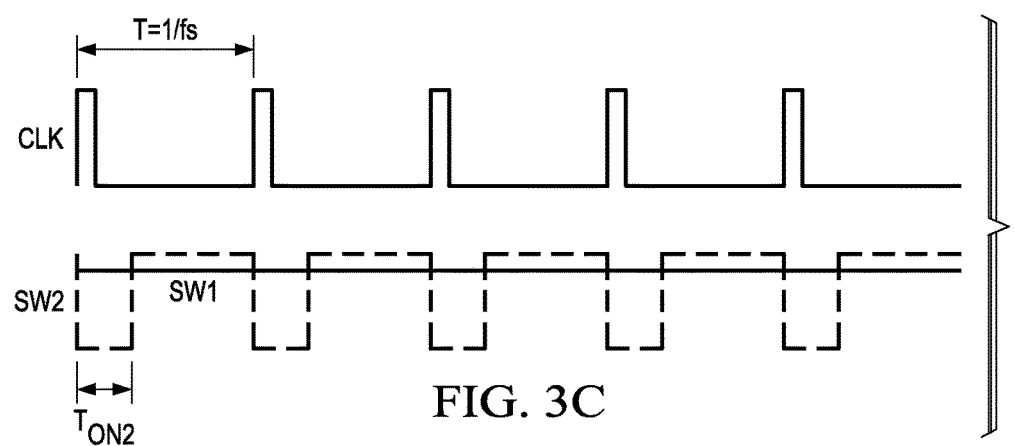
FIG. 3C illustrates in a simplified timing diagram the buck-boost converter of FIGS. 3A, 3B in a boost mode of operation.
Figure 4:
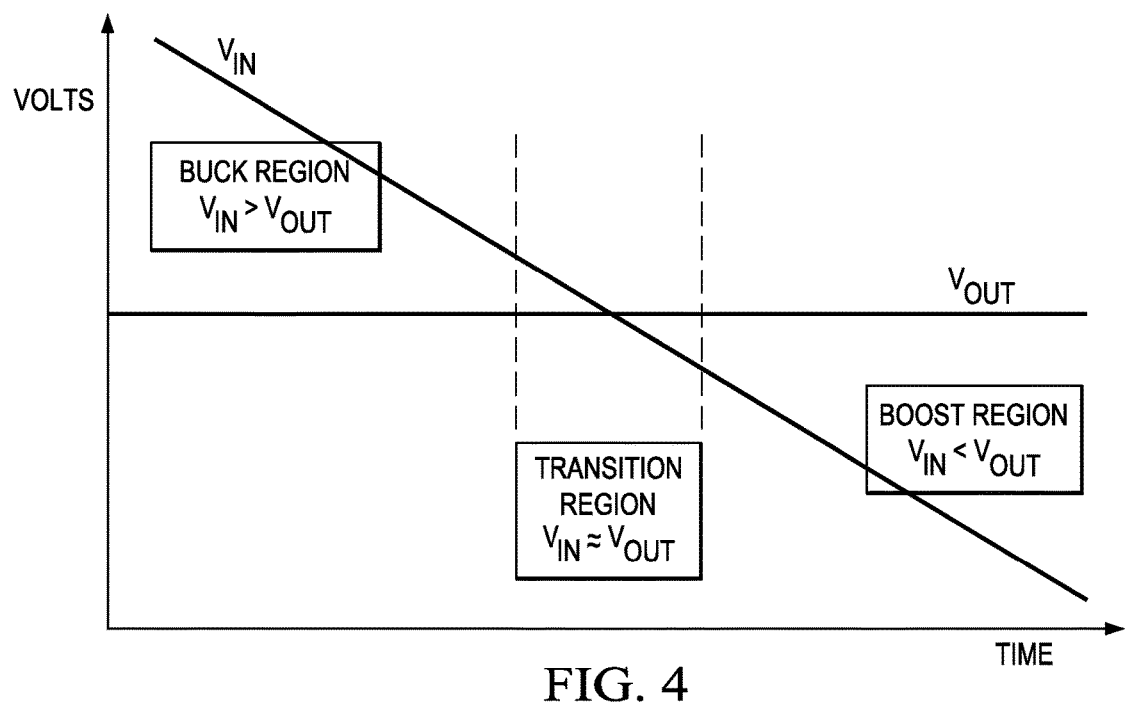
FIG. 4 illustrates in a graph the operations of a conventional buck-boost converter in transitioning from buck to boost modes of operation.
Figure 5:
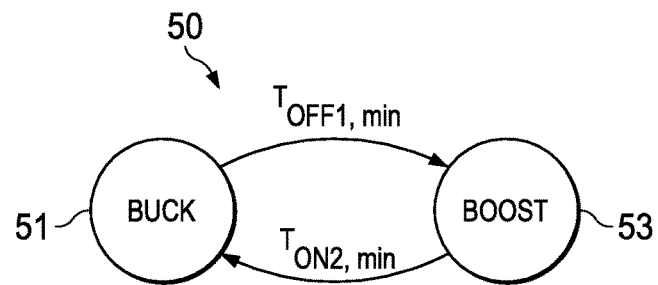
FIG. 5 illustrates in a state transition diagram the transitions of a conventional buck-boost controller between buck and boost modes of operation.
Figure 6:
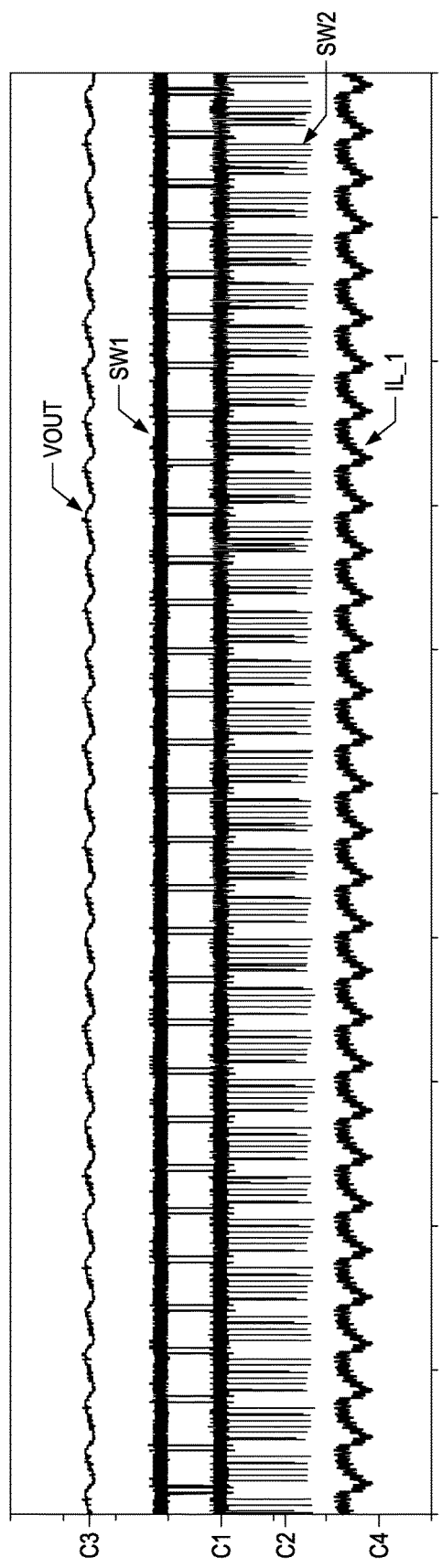
FIG. 6 illustrates in a signal trace diagram selected signals of a conventional buck-boost converter in transitions between buck and boost modes of operation.

FIG. 8 presents an example state transition table 80 to provide further explanation of the operation of the four state controller 70 of FIG. 7. In FIG. 8, the column labeled "STATE" indicates the current state, the column labeled "NEXT STATE" indicates the next state that the four controller will transition to, the column labeled "INPUTS" indicates the condition of the minimum timer (labeled "MIN.TIMER") and the hysteresis timer (labeled "HYS.TIMER") flags that are input to the four state controller. The columns under the heading "OUTPUTS" indicates the condition of the driver gate signals LDRV1, LDRV2, HDRV1, HDRV2 used to control a four switch buck-boost controller such as the one illustrated in FIG. 1.

In the table 80, the first row indicates that the four state machine 70 is in a BUCK state such as state 71 in FIG. 7. In the BUCK state, the gate control signal LDRV1 that controls the first low side driver is coupled to the switching signal "pwm." The gate control signal LDRV2, coupled to the gate of the second low side driver, is at a ground or "0" state, the gate control signal to the first high side driver HDRV1 is coupled to a complementary switching signal "pwm_c" and the second high side driver HDRV2 is coupled to a high voltage represented as a "1". As described above, the signals to the first low side driver LDRV1 and the first high side driver gate signal HDRV1 are switching signals in the buck mode, and the output voltage is less than the input voltage in the buck mode. (Note that for ease of reading table 80, the output states are not repeated for each row, but the outputs for the first row, which is a BUCK current state, are used for each of the rows that have either a BUCK current state or a TRANS_BUCK current state; similarly, the outputs indicated for the third row, which is a BOOST current state, are also used for each of the rows that have either a BOOST or a TRANS_BOOST current state.)

In the first row of table 80, the timer input labeled MIN. TIMER is shown as a "1". In this condition the four state controller transitions to a next state of TRAN_BOOST. The minimum timer "1" condition in a buck state indicates that the input voltage is so close to the output voltage that the four switch converter cannot maintain the output voltage in the pure buck mode, that is, the maximum duty cycle for the buck mode has been reached.

In the second row of table 80, on the other hand, the minimum timer flag is zero, indicating that in the buck mode the four switch converter is able to regulate the output voltage to the correct voltage. In this case, the next state is also the BUCK state, such as 71 in FIG. 7, because the input voltage is still substantially greater than the output voltage and the converter can remain in the BUCK state.

In the third row of table 80, the current state is indicated as the BOOST state, such as state 73 in FIG. 7. In the BOOST state, the table 80 also indicates that the output to the gate control signal LDRV2 of the low side driver is the switching signal "pwm." The gate control signal HDRV2 is coupled to the complementary switching signal "pwm_c." The input voltage is always coupled to the inductor in the boost mode, so the gate control signal HDRV1 is always on as indicated by the "1" in table 80. The gate control signal LDRV1 is "0" or ground.

In the third row, the MIN. TIMER flag is set to a "1" and the next state for the four state controller is indicated as the transition buck state, TRAN_BUCK, such as state 75 in FIG. 7. In this case, the four switch converter cannot continue to regulate the output voltage in only a boost mode because the input voltage VIN is nearing the output voltage VOUT, and the minimum duty cycle (minimum pulse width for $T_{ON2}$) is reached. The next state is therefore a buck state in the transition mode, TRAN_BUCK.

In the fourth row of table 80, the current state is the BOOST state, such as state 73 in FIG. 7. In this case, the MIN.TIMER flag is not set, so the next state is also the BOOST state. In this example the output voltage VOUT is greater than the input voltage and the four switch buck-boost converter can regulate the output voltage using only the boost mode, so the four state controller remains in the boost state.

The last four rows of table 80 illustrate the operation of the four state controller in the transition states. In the fifth row, the current state is indicated as TRAN_BOOST, such as state 77 in FIG. 7. The state controller in the TRAN_BOOST state tests the hysteresis flag HYS. TIMER. In the case illustrated in the fifth row, the flag HYS. TIMER is shown as "0". The next state in the four state controller is indicated as the TRAN_BUCK state, such as state 75 in FIG. 7. Thus in the transition states TRAN_BOOST and TRAN_BUCK, the four state controller transitions in each clock cycle between the TRAN_BOOST and TRAN_BUCK states when the hysteresis flag HYS. TIMER is at a "0."

The sixth row of table 80 illustrates the operation of the four state controller in a case wherein the current state TRAN_BOOST, the flag HYS. TIMER is a "1" and the next state is indicated as BOOST such as state 73 in FIG. 7. The four state controller of the present application transitions back to the conventional boost mode when the hysteresis timer indicates the pulse width of the lower driver control signals is of sufficient duration. In this example, the flag HYS.TIMER indicates the input voltage is less than the output voltage by an amount such that the four switch converter can regulate the output voltage in only a boost mode.

The seventh row of table 80 illustrates the operation of the four state controller when the current state is a transition buck mode TRAN_BUCK, such as state 75 in FIG. 7. In the seventh row, the hysteresis timer flag HYS. TIMER is at a "0" level, and the next state is indicated as TRAN_BOOST, such as state 77 in FIG. 7. Thus, as in the TRAN_BOOST state, when the four state controller is in the transition current state TRAN_BUCK and the hysteresis flag HYS.TIMER is not set, the four state controller of the present application transitions back to the transition boost state TRAN_BOOST.

The eighth row of table 80 illustrates the operation of the four state controller when the current state is TRAN_BUCK and the hysteresis timer flag is set to a "1". In this case, the next state is then the BUCK state such as state 71 in FIG. 7. Thus the four state controller transitions from the transition buck mode to a conventional buck state only when the hysteresis timer indicates that the input voltage is greater than the output voltage by an amount that is sufficient to allow the four switch converter to regulate the output voltage using only a buck mode of operation.

The four state controller arrangement thus provides a novel pair of transition states, a buck transition state, and a boost transition state, and during a transition mode of operation, the four state controller transitions in alternating clock cycles from buck mode to boost mode until a separate hysteresis timer indicates that either the pure buck mode, or the pure boost mode, can regulate the output voltage. In sharp contrast to the prior known solutions, the four state controller of the present application provides a controlled transition between buck and boost modes of operation.

Figure 9:
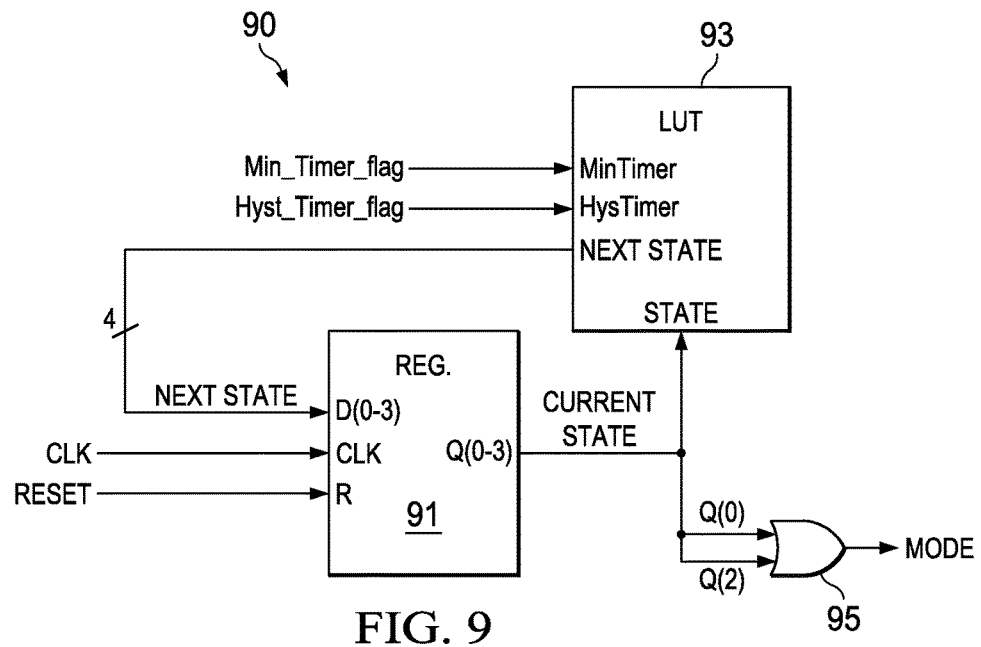
FIG. 9 illustrates in a circuit diagram an example implementation of a state machine for use with arrangements for a buck-boost controller in an aspect of the present application.

FIG. 9 depicts in another aspect of the present application an example implementation 90 of the four state controller illustrated in FIGS. 7 and 8. In FIG. 9, the four state controller 90 is implemented using a four bit register 91 and a look up table LUT 93 which implements a state machine that can perform, for example, the state transition table 80 shown in FIG. 8. The look up table LUT 93 receives as inputs the current state, represented by the outputs Q (0-3) from the register 91, the minimum timer signal labeled Min_Timer_flag, and the hysteresis timer signal labeled Hyst_Timer_flag. The look up table 93 outputs the next state (as shown in table 80 in FIG. 8) which is a four bit field coupled to the data inputs of the register 93. At the rising edge of the clock signal CLK at the beginning of each clock cycle, the next state is clocked into the register 91 and the output signals Q (0-3) indicate the current state.

The logical gate 95 receives the state bits Q (0) and Q (2) from the register 91. As shown in FIG. 7, the buck state 71, and the transition buck state 75, are uniquely identified by a "1" in the Q (0), and Q (2), positions respectively. Thus logic gate 95, which is an OR gate, outputs a MODE signal that is a logical "1" when the four state controller 90 is in either a buck or a transition buck mode. In alternative arrangements, the polarities of the state machine signals Q (0-3) can be varied and the logical gate 95 can be replaced by other logical functions that perform the same role.

Figure 10:
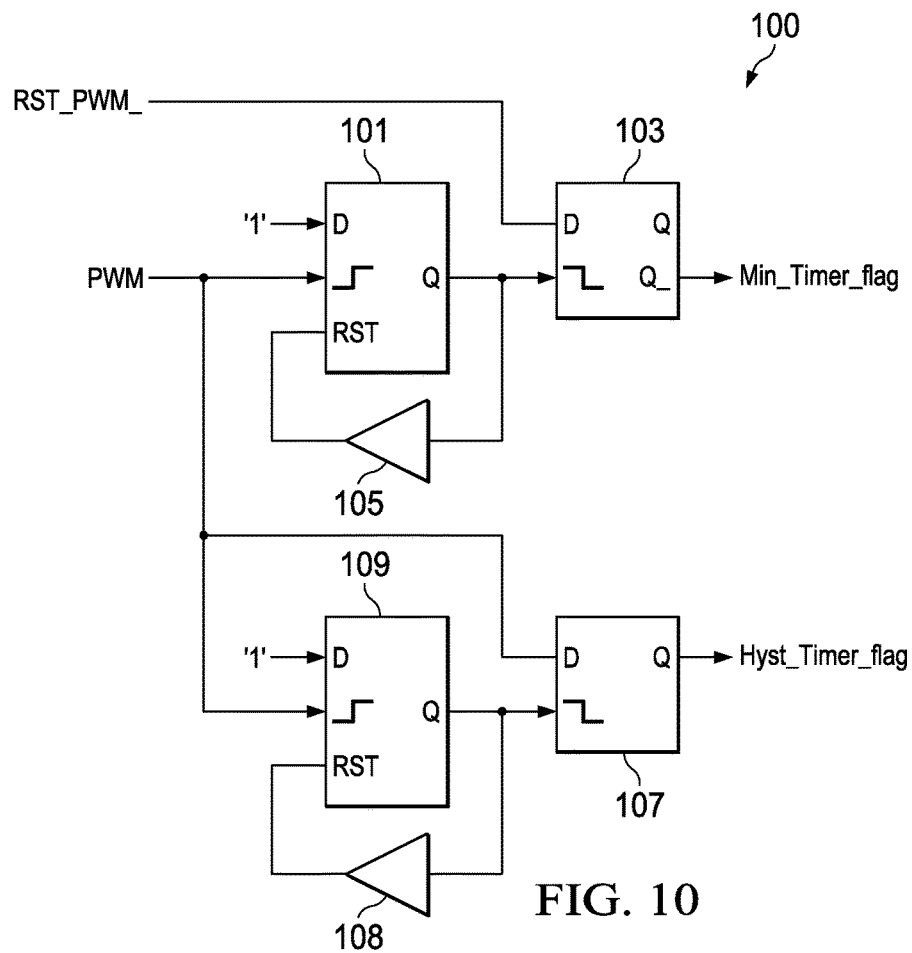
FIG. 10 illustrates in another circuit diagram an example implementation of timer flag circuits for use with the state machine of FIG. 9 in an aspect of the present application.

FIG. 10 illustrates, in another aspect of the present application, an example implementation flag circuit 100 for providing the minimum timer flag Min_Timer_flag, and the hysteresis timer flag Hyst_Timer_flag as shown above in FIG. 9. In circuit 100, a first edge triggered flip flop 101 receives the rising edge of the switching signal PWM at the clock input, and clocks in a "1" at each rising edge. The output Q is then coupled to a reset input RST through a delay buffer 105. The output Q is also coupled to a second edge triggered flip flop 103, which receives the falling edge of the Q signal at its clock input. When the PWM pulse is of short duration less than a minimum time, the Min_Timer_flag signal is set.

In circuit 100 in FIG. 10, another edge triggered flip flop 109 receives the rising edge of the pulse width modulated switching signal PWM at the clock signal input, and a "1" is input to the D input. The falling edge of the output signal Q is then coupled to the clock input of a second edge triggered flip flop 107. The output Q of register 109 is coupled through a delay buffer 108 to a reset pin. When the duration of the pulse on the PWM switching signal is of sufficient duration, the output of register 107, the Hyst_Timer_flag, is set.

Figure 11:
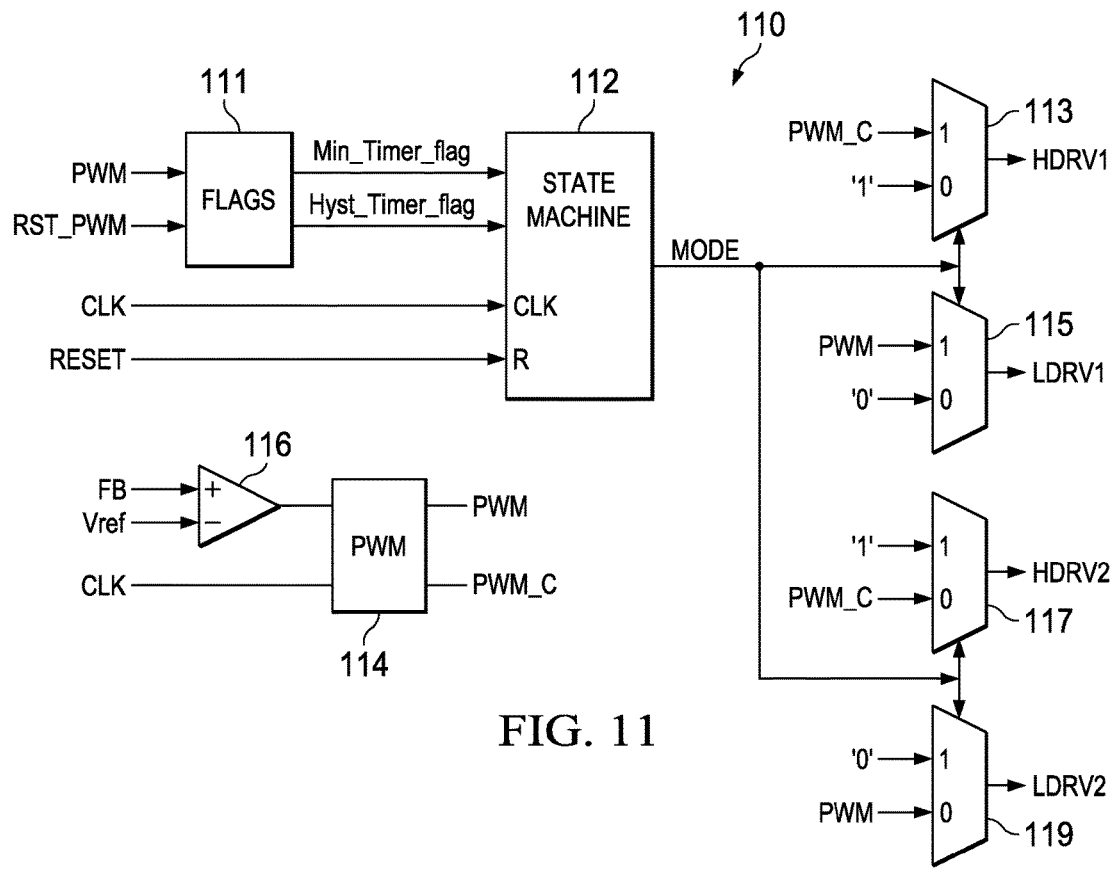
FIG. 11 illustrates in a circuit diagram an arrangement for a buck-boost controller incorporating the state machine of FIG. 9 and the flag circuits of FIG. 10 in yet another aspect of the present application.

FIG. 11 illustrates, in a simplified circuit diagram, an example implementation of a controller circuit 110 for a four switch buck-boost converter incorporating the four state buck-boost arrangement of the present application. Controller circuit 110 includes a flag circuit 111 which can be implemented, for example, as shown in FIG. 10. The outputs are the minimum timer signal labeled Min_Timer_flag and the hysteresis signal labeled Hyst_Timer_flag. The state machine 112, which can be implemented as shown in FIG. 9, for example, has as inputs the two flags, a clock signal CLK that determines the switching frequency Fs, and a reset signal RESET. The output of the state machine 112 is a MODE signal which, as described above, indicates whether the controller is in one of the buck mode states, BUCK and TRAN_BUCK, or a boost mode state BOOST and TRAN_BOOST. The controller circuit 110 outputs the four driver control signals HDRV1, LDRV1, HDRV2, and LDRV2 to control the four driver transistors for the switching buck boost controller. A comparator 116 receives input signals FB and Vref. The FB signal is a feedback input coupled to the output voltage. The result of a comparison between the FB signal and a reference voltage Vref is input into a pulse width modulation circuit PWM 114. The circuit 114 also receives the clock signal CLK. For each clock cycle, the PWM 114 outputs a pulse width modulated signal PWM and its complement PWM_C. The widths of the pulses are determined by the compare signal from comparator 116.

In operation, the multiplexer 113 receives the MODE signal which is a "1" in buck mode and a "0" in boost mode. As shown in FIG. 11, the multiplexer 113 outputs a "1" to the HDRV1 signal when the controller is in a boost mode, and in the buck mode, the output of the multiplexer is the complementary pulse modulated signal PWM_C output from circuit 114. Signal PWM_C is a pulse which changes duration during each clock cycle based on the output voltage and the comparison to a desired output voltage at comparator 114. The pulse duration of the signal PWM_C is used to regulate the output voltage.

In FIG. 11, similar multiplexers 115, 117, and 119 output the appropriate gate control signals LDRV1, HDRV2, LDRV2 to the corresponding transistors in the four switch converter as needed to operate the buck-boost DC converter. The outputs can be a "1" when the selected driver transistor is always on, a "0" when the driver transistor is always off and either the pulse width modulation signal PWM or the complementary signal PWM_C when the transistors are being switched on and off.

The multiplexers 113, 115, 117, 119 and the state machine 112 with flags 111 implement the state controller table 80 presented in FIG. 8. The output signals are determined by the MODE signal from state machine 112, while the next state for the state machine 112 is determined by the flag signals from the flag circuit 111.

Figure 12:
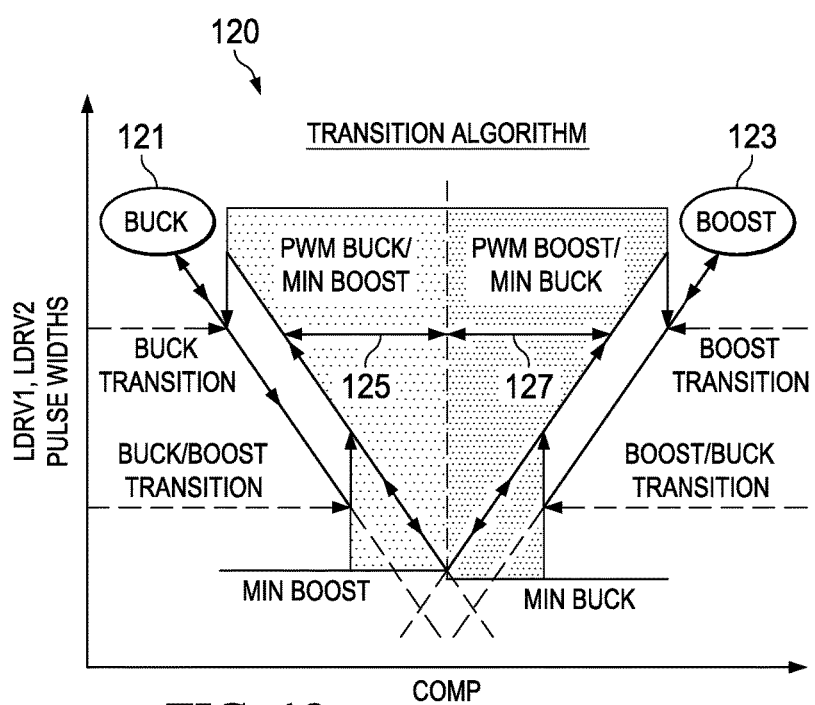
FIG. 12 illustrates in a diagram the operation of an arrangement for a buck-boost controller in another aspect of the present application as the controller makes transitions from pure buck operation to a transition mode, and then to pure boost operation.

FIG. 12 illustrates in a graphical view 120 the modes of operation and the pulse widths of the lower gate control signals LDRV1, LDRV2 to the buck-boost converter for various states of the input voltage and the output voltage. The comparison signal COMP is shown on the horizontal axis, which is the output of a comparison between the output voltage and a reference voltage and is part of the logic that determines the width of the pulse modulated signal PWM. In FIG. 12, when the input voltage is considerably greater than the output voltage, the converter operates in pure buck mode as shown by the oval 121. As the input voltage increases relative to the output voltage, the converter transitions from the pure buck mode to the transition buck mode as shown in area 125, and the buck modes are interspersed with boost operations by transitions in the state controller from the transition buck and the transition boost states. As the controller transitions back and forth, the gate control signals change pulse duration in response to the pulse width modulated signals PWM and PWM_C to control the output voltage. As the input voltage becomes greater and approaches equality with the output voltage, both the LDRV1 and LDRV2 pulses will become a minimum width, and the controller will transition back and forth from buck to boost operations. This is shown at the bottom of the shaded area.

As the input voltage becomes greater than the output voltage, the controller will operate in the transition boost mode with some buck mode operations as shown in region 127 of FIG. 12. The pulse widths of the gate control signals LDRV1 and LDRV2 will be pulse width modulated to control the output voltage as the controller transitions from the transition buck to the transition boost mode as described above. As the output voltage increases still further with respect to the input voltage, the flag "Hyst_Timer" will become true as the pulse width for the lower gate control signal LDRV2 increases, and the controller will transition from the transition boost state to the pure boost state. This is indicated by the oval 123 labeled BOOST in the graph of FIG. 12.

FIG. 13 illustrates in a simple timing diagram the switching operation of the four state controller between the transition buck (state 0001) and transition boost (state 0010) operations in the region 125 in the transition diagram of FIG. 12. In this mode, while the state controller transitions between transition buck and transition boost modes, the driver gate control signals are modulated to control the output voltage in a buck mode with a minimum boost mode.

FIG. 14 illustrates in a simple timing diagram the operation of the four state controller as described above in transitioning between the transition boost (labeled state 0010) and transition buck (labeled state 0001) operations when the controller is in the region of 127 of FIG. 12. In this mode, the controller is in a boost mode with minimum buck operations as the state machine transitions from transition buck to transition boost. The gate control signals are again pulse width modulated to regulate the output voltage in a boost mode.

Figure 15:
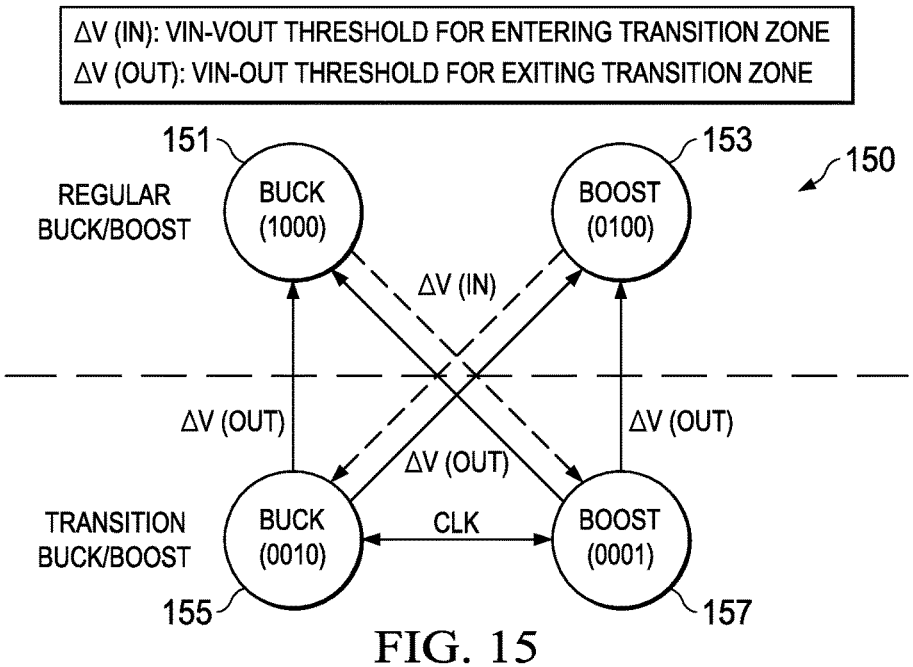
FIG. 15 illustrates in a simple state transition diagram the state transitions for an alternative arrangement of a buck-boost controller in another aspect of the present application.

FIG. 15 depicts in another state diagram 150 the state transitions for an alternative state machine arrangement in another aspect of the present application. In this alternative arrangement, the four state controller transitions from state to state based not on the timer flags, which correspond to the pulse widths of the pulse modulated signals, but instead based on the voltage differentials $\Delta V$ between the input voltage VIN and the output voltage VOUT.

In FIG. 15, state 151 labeled BUCK corresponds to the pure buck mode of operation, with no boost operations needed. In state 151, the four switch buck-boost converter can regulate VOUT using only the buck mode, so VIN>VOUT. In state 153 labeled BOOST, the converter is in a pure boost mode of operations with no buck mode operations. In this mode, the four switch converter can regulate the output voltage using only boost mode operations, so that the output voltage is greater than the input voltage by a sufficient amount, VOUT>VIN.

In state 155, the state diagram 150 in FIG. 15 indicates that the switching converter is in a transition buck mode. In this mode of operation, the input voltage is close to the output voltage and the switching converter can no longer operate in buck mode only to regulate the output voltage. In this mode, the controller transitions from transition buck to transition boost modes each clock cycle. The pulse width modulation signal PWM and the complementary pulse width modulation signal PWM_C are used to control the higher and lower gate driver control signals HDRV1, LDRV1, HDRV2 and LDRV2 to regulate the output voltage. In state 157 in FIG. 15, the controller is in a transition BOOST state, which indicates the output voltage is greater than the input voltage, but in this transition mode not by a sufficient amount to allow the switching converter to regulate the output voltage in the pure boost mode. In this transition mode state 157 the controller will transition back to the transition buck state 155 and the pulse width modulated signals will cause both buck and boost operations to regulate the output voltage.

In FIG. 15, the transitions between states are determined by two differential voltages. $\Delta V(IN)$ is a threshold condition for entering the transition states from a buck or boost state. This differential threshold condition indicates the input voltage has approached the output voltage (or vice versa) and is within a predetermined range of the output voltage. The second voltage differential $\Delta V(OUT)$ indicates a threshold differential voltage for exiting the transition mode states 155, 157 and returning to either a buck or boost mode in states 151, 153. The second differential voltage condition $\Delta V(OUT)$ is met when the output voltage and the input voltage differ by a sufficient amount to allow the converter to regulate the output voltage in either a buck, or a boost, mode without intervening cycles of the other mode.

In operation, FIG. 15 illustrates that when the converter begins in either the BUCK (VIN>VOUT) or BOOST (VOUT>VIN) modes, when the differential voltage condition $\Delta V(IN)$ is met, the controller transitions into one of the transition mode states. The buck state 151 transitions to the transition boost mode 157. The boost state 153 transitions to the transition buck mode 155.

When in one of the transition modes indicated in FIG. 15 as the transition buck state 155 and transition boost mode 157, and the differential voltage condition $\Delta V(OUT)$ is met, the controller will transition to either the buck mode indicated as state 151, or the boost mode, indicated as state 153.

The voltage based transition arrangement of FIG. 15 can be used as an alternative to the timer flag based transition arrangement of FIG. 7, described above. In some applications, the voltage based scheme can be advantageous over the timer based scheme. However, the window for the voltage based transition scheme may have to be wider than the timer based scheme, to include worst case conditions. Another alternative arrangement that is also contemplated as part of the present application can be formed by using both the voltage based and the timer based transition schemes together. For example, in an arrangement the controller can transition to the transition modes from the buck or boost modes based on the minimum timer flag as described above, but can then make the transitions from the transition modes (transition buck and transition boost) back to the buck or boost modes using the differential voltage based scheme.

Figure 16:
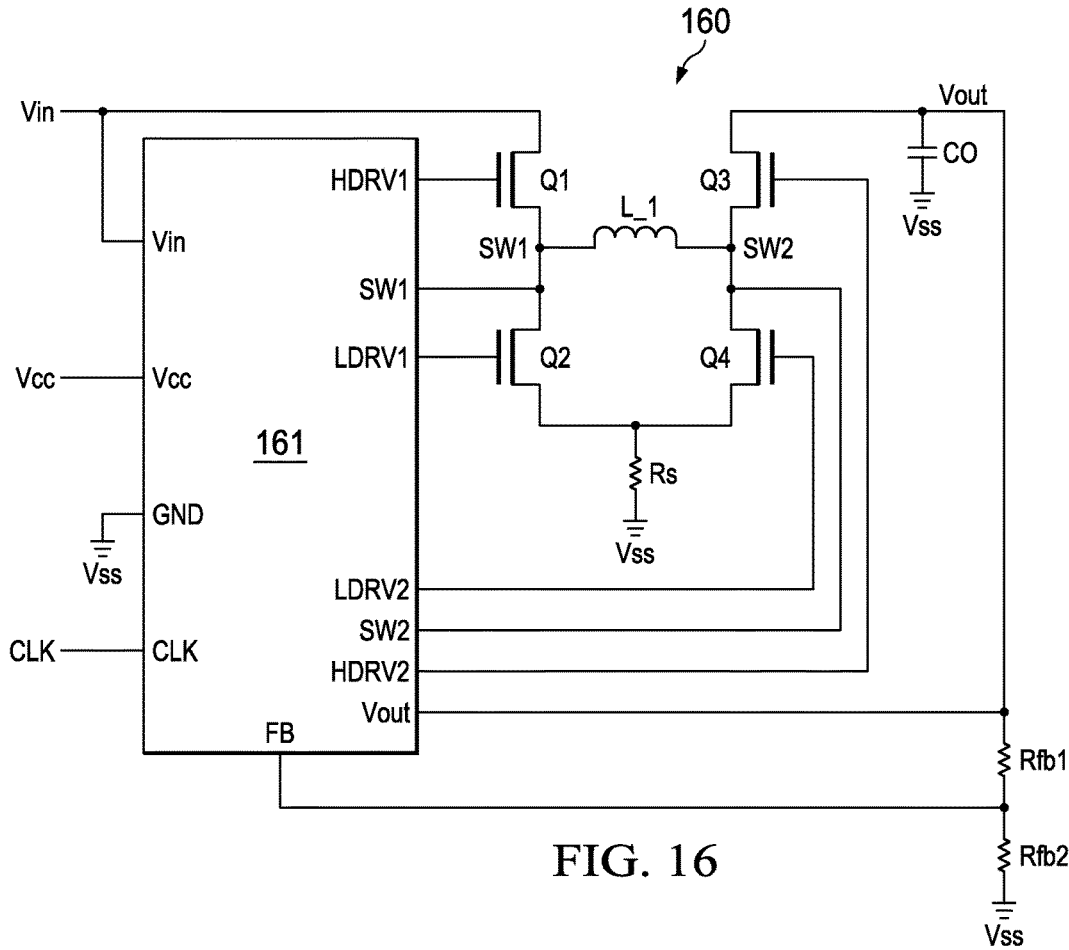
FIG. 16 illustrates in a simplified circuit diagram an arrangement for a buck-boost converter having a buck-boost controller circuit that incorporates various features of selected aspects of the present application.

FIG. 16 illustrates in an example arrangement for a buck-boost converter 160 that forms an additional aspect of the present application. In FIG. 16, the buck boost circuit is controlled by a buck-boost controller circuit 161 incorporating the features described above including the four state converter controller. In FIG. 16, the controller circuit 161 can be formed as a single integrated circuit in an example arrangement, or in an alternative arrangement that is also contemplated as an further aspect of the present application, the controller circuit 161 can be provided as a system on a chip, to provide a complete controller solution in one packaged integrated circuit device. Alternatively, a circuit module implementing controller 161 can be provided including, for example, an ASIC, FPGA or other programmable logic device to provide the state machine, logic and registers to provide the flags, oscillator devices to provide the pulse width modulated signal PWM, and the like as discrete components or off the shelf integrated circuits. Additional alternative arrangements for providing the controller circuit 161 include multiple chip modules, stacked packages, and other packaging solutions that can be used for packaging multiple integrated circuit devices together.

In operation, the buck-boost controller circuit 161 provides the gate control signals HDRV1, LDRV1, HDRV2, HDRV2 to the four switch devices Q1, Q2, Q3, Q4 using the four state controller and the condition flags as described above. The FB input to the controller circuit 161 provides a measure of the current output voltage for use in a comparator that modulates the pulse width of the switching signals PWM, PWM_C that are used to switch on and off the driver devices Q1, Q2, Q3, Q4 that are regulating the output voltage in buck and boost mode operations. The Vout input signal and the Vin input to controller 161 provide voltage signals to comparators (not visible in FIG. 16) for determining the difference between the input voltage and the output voltage for forming the signals $\Delta V(IN)$ and $\Delta V(OUT)$ as discussed above.

In an application example that utilizes the example arrangements described above including a four state controller and the flag circuits as shown above, a single chip integrated circuit was formed and used in a wide input voltage DC-DC buck-boost converter as shown in FIG. 16. The buck-boost converter has an input voltage range of 6-42V. The output voltage is designed at 12 Volts with a 6 Ampere steady state load current rating. The inductor L_1 and the high and low side driver MOSFET devices Q1, Q2, Q3, and Q4 are selected based on the circuit parameters. In the example application, the MOSFET devices Q1, Q2 can be coupled to the maximum input voltage Vin=42V. In order to provide sufficient margin, the driver transistor devices selected are rated at 60 Volts. For the MOSFET devices Q3, Q4 in the example application, the maximum output voltage is 12 Volts. In order to provide sufficient margin, the devices selected are rated at 20 Volts. The inductor L_1 was chosen to be of a value to carry the peak current which is estimated at 21.6 Amps. The value of the inductor is 4.3 uH, a compromise value between the optimum values for the buck and the boost modes of operation.

By incorporating the four state buck-boost controller of the arrangements described herein within a buck-boost converter, a smooth transition buck-boost converter with reduced switching noise and increased efficiency is provided. In sharp contrast to the prior known solutions, the buck-boost converter incorporating the novel arrangements provided herein will smoothly transition from buck to boost modes and back when the input voltage is near the output voltage, reducing noise due to erratic or random transitions.

Although the example arrangements that form aspects of the present application have been described in detail, it should be understood that various changes, substitutions and alterations can be made herein without departing from the spirit and scope of the application as defined by the appended claims.

Moreover, the scope of the present application is not intended to be limited to the particular example arrangements of the process, machine, manufacture, and composition of matter, means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A buck-boost converter for producing a DC output voltage from a DC input voltage, comprising:
   a first high side driver switch coupled between a node for receiving an input voltage and a first node for coupling to an inductor;
   a first low side driver switch coupled between the first node and a ground voltage;
   a second high side driver switch coupled between a node for outputting an output voltage and a second node for coupling to the inductor;
   a second low side driver switch coupled between the second node and a ground voltage, wherein each of the first and second high side driver switches and each of the first and second low side driver switches further comprise a transistor having a gate control signal as an input;

a control circuit for controlling the first high side switch, the second high side switch, the first low side switch, and the second low side switch and configured to operate as a buck-boost converter, and further comprising:

a state machine having four states comprising a buck state, a boost state, a transition buck state, and a transition boost state;

a hysteresis timer having an output indicating a pulse width time greater than a threshold time has elapsed coupled to the state machine; and a minimum timer having an output indicating a pulse width time less than a minimum threshold time has elapsed coupled to the state machine, wherein the state machine in the control circuit transitions from the buck state to the transition boost state in response to the minimum timer output, wherein the state machine in the control circuit transitions from the boost state to the transition buck state in response to the minimum timer output, wherein the state machine in the control circuit transitions from the transition boost state to the transition buck state when the hysteresis timer output is false.

2. The buck-boost converter of claim 1, wherein the control circuit outputs a first high side driver signal coupled to the gate control signal of the first high side driver switch, a first low side driver signal coupled to the gate control signal of the first low side driver switch, outputs a second high side driver signal coupled to the gate control signal of the second high side driver switch, and outputs a second low side driver signal coupled to the gate control signal of the second low side driver switch.

3. The buck-boost converter of claim 2, wherein the control circuit further comprises a pulse width modulator generating a pair of pulse width modulated signals that are further coupled to the gate control signals of the first high side driver switch, the first low side driver switch, the second high side driver switch, and the second low side driver switch to control the output voltage.

4. The buck-boost converter of claim 1, wherein the state machine in the control circuit transitions from the transition boost state to the boost state when the hysteresis timer output is true.

5. The buck-boost converter of claim 1, wherein the state machine in the control signal transitions from the transition buck state to the buck state when the hysteresis timer output is true.

6. A method for controlling a buck-boost DC to DC converter, comprising:

providing an inductor coupled between a first switching node and a second switching node;

in a buck mode state of a buck-boost controller, coupling a pulse width modulated switching signal to a first low side gate signal of a low side driver device coupled between the first switching node and a ground voltage, coupling a complementary pulse width modulated switching signal to a first high side gate signal of a first high side driver device coupled between the first switching node and an input voltage, and coupling an output voltage to the second switching node;

and further comprising:

providing a minimum timer flag that indicates the pulse width modulated switching signal has a duration less than a predetermined minimum pulse width and providing a hysteresis flag that indicates the pulse width modulated switching signal has a duration that is greater than a predetermined minimum pulse width;

in a boost mode state of the buck-boost controller, coupling the pulse width modulated switching signal to a second low side gate signal of a low side driver device coupled between the second switching node and the ground voltage, coupling the complementary pulse width modulated switching signal to a second high side gate signal of a second high side driver device coupled between the second switching node and the output voltage, and coupling the input voltage to the first switching node;

in a transition buck mode state of the buck-boost controller, coupling a pulse width modulated switching signal to the first low side gate signal and coupling a complementary pulse width modulated switching signal to the first high side gate signal; and in a transition boost mode state of the buck-boost controller, coupling the pulse width modulated switching signal to the second low side gate signal of the low side driver device, and coupling the complementary pulse width modulated switching signal to the second high side gate signal;

further comprising:

operating the buck-boost controller in the buck state;

receiving a true condition on the minimum timer flag; and transitioning the buck-boost controller to the transition boost state;

operating the buck-boost controller in the transition boost state;

receiving a false condition on the hysteresis flag; and transitioning the buck-boost controller to the transition buck state.

7. The method of claim 6, and further comprising:

operating the buck-boost controller in the buck state;

receiving a true condition on the minimum timer flag; and transitioning the buck-boost controller to the transition boost state.

8. The method of claim 6, and further comprising:

operating the buck-boost controller in the transition boost state;

receiving a true condition on the hysteresis flag; and transitioning the buck-boost controller to the boost state.

9. The method of claim 6, and further comprising:

operating the buck-boost controller in the boost state;

receiving a true condition on the minimum timer flag; and transitioning the buck-boost controller to the transition buck state.

10. A method for controlling a buck-boost DC to DC converter, comprising:

providing an inductor coupled between a first switching node and a second switching node;

in a buck mode state of a buck-boost controller, coupling a pulse width modulated switching signal to a first low side gate signal of a low side driver device coupled between the first switching node and a ground voltage, coupling a complementary pulse width modulated switching signal to a first high side gate signal of a first high side driver device coupled between the first switching node and an input voltage, and coupling an output voltage to the second switching node;

and further comprising:

providing a minimum timer flag that indicates the pulse width modulated switching signal has a duration less than a predetermined minimum pulse width and providing a hysteresis flag that indicates the pulse width modulated switching signal has a duration that is greater than a predetermined minimum pulse width;

in a boost mode state of the buck-boost controller, coupling the pulse width modulated switching signal to a second low side gate signal of a low side driver device coupled between the second switching node and the ground voltage, coupling the complementary pulse with modulated switching signal to a second high side gate signal of a second high side driver device coupled between the second switching node and the output voltage, and coupling the input voltage to the first switching node;

in a transition buck mode state of the buck-boost controller, coupling a pulse width modulated switching signal to the first low side gate signal and coupling a complementary pulse width modulated switching signal to the first high side gate signal; and in a transition boost mode state of the buck-boost controller, coupling the pulse width modulated switching signal to the second low side gate signal of the low side driver device, and coupling the complementary pulse with modulated switching signal to the second high side gate signal;

further comprising:

operating the buck-boost controller in the buck state;

receiving a true condition on the minimum timer flag; and transitioning the buck-boost controller to the transition boost state;

operating the buck-boost controller in the transition boost state;

receiving a false condition on the hysteresis flag; and transitioning the buck-boost controller to the transition buck state and further comprising:

operating the buck-boost controller in the boost state;

receiving a true condition on the minimum timer flag; and transitioning the buck-boost controller to the transition buck state and operating the buck-boost controller in the transition buck state;

receiving a true condition on the hysteresis flag; and transitioning the buck-boost controller to the buck state.

11. The method of claim 10, and further comprising:

operating the buck-boost controller in the buck state;

receiving a first differential voltage input indicating the difference between the input voltage and the output voltage is below a predetermined minimum delta voltage; and transitioning the buck-boost controller to the transition boost state.

12. The method of claim 11, and further comprising:

operating the buck-boost controller in the transition boost state;

receiving a second differential voltage input indicating the difference between the input voltage and the output voltage is greater than a predetermined minimum delta voltage; and transitioning the buck-boost controller to the boost state.

13. An integrated circuit having a control circuit for controlling a four switch buck-boost DC to DC converter; comprising:

a first high side driver switch gate control signal output for controlling a first high side driver device;

a first low side driver switch gate control signal output for controlling a first low side driver device;

a second high side driver switch gate control signal output for controlling a second high side driver device;

a second low side driver switch gate control signal output for controlling a second low side driver device;

a state machine having four states comprising a buck state, a boost state, a transition buck state, and a transition boost state and outputting the first high side driver switch gate control signal, the first low side driver switch gate control signal, the second high side driver switch gate control signal, and the second low side driver switch gate control signal;

a hysteresis timer having an output indicating that a pulse width of a pulse width modulated switching signal is greater than a threshold time coupled to the state machine, a minimum timer having an output indicating that a pulse width of a pulse width modulated switching signal is less than a minimum threshold time coupled to the state machine, wherein the state machine in the control circuit transitions from the buck state to the transition boost state in response to the minimum timer output, wherein the state machine in the control circuit transitions from the boost state to the transition buck state in response to the minimum time output, wherein the state machine in the control circuit transitions from the transition boost state to the transition buck state when the hysteresis timer output is false.

\* \* \* \* \*